United States Patent [19]

Emmons et al.

[11] 4,331,793

[45] May 25, 1982

[54] HYDROCURABLE AMBIENT CURING POLYEPOXIDE COATING AND ADHESIVE COMPOSITIONS AND METHOD OF USING THEM

[75] Inventors: William D. Emmons, Huntingdon Valley; Wayne E. Feely, Rydal, both of Pa.

[73] Assignee: Rohm and Haas Company, Philadelphia, Pa.

[21] Appl. No.: 245,297

[22] Filed: Mar. 19, 1981

Related U.S. Application Data

[62] Division of Ser. No. 116,693, Jan. 30, 1980.

[51] Int. Cl.$^3$ .................. C08F 24/00; C08F 26/06
[52] U.S. Cl. ..................................... 526/260; 525/383
[58] Field of Search ......................................... 526/260

[56] References Cited

U.S. PATENT DOCUMENTS

| | | | |
|---|---|---|---|
| 3,037,006 | 5/1962 | Hankins et al. | 260/80.5 |
| 3,208,981 | 9/1965 | Miranda et al. | 525/119 X |
| 3,291,775 | 12/1966 | Holm | 260/47 |
| 3,342,786 | 9/1967 | Emmons | 526/260 |
| 3,547,886 | 12/1970 | Gardner et al. | 260/47 |
| 3,630,996 | 12/1971 | Tomalia | 528/117 |
| 3,640,957 | 2/1972 | Tomalia et al. | 528/117 |
| 3,716,520 | 2/1973 | Tomalia | 528/117 |
| 3,749,683 | 7/1973 | Tomalia et al. | 528/117 |
| 3,787,380 | 1/1974 | Stamberger | 526/260 |
| 3,979,406 | 9/1976 | D'Alelio | 526/260 |
| 4,075,023 | 2/1978 | Priem et al. | 526/260 X |

Primary Examiner—Earl A. Nielsen
Attorney, Agent, or Firm—Lester E. Johnson

[57] ABSTRACT

Resin-forming polyepoxides are mixed with polyoxazolidinyl compounds or polymers containing pendant oxazolidinyl groups in which the carbon atom in the 2-position of the heterocyclic ring is substituted with saturated hydrocarbon groups, such as dialkyl, or with an alkylene group forming a saturated ring with the carbon atom in the 2-position of the oxazolidinyl ring to form, in the absence of water, a stable composition which can be stored in closed containers for months without undergoing gelation. When such compositions are spread into films and the films exposed to moisture at ambient temperature, e.g., to ambient air having a relative humidity of at least 20% and temperature of about 15° to 25° C., the polymer serves to react with and cure the polyepoxide.

3 Claims, No Drawings

HYDROCURABLE AMBIENT CURING POLYEPOXIDE COATING AND ADHESIVE COMPOSITIONS AND METHOD OF USING THEM

This is a division of application Ser. No. 116,693 filed Jan. 30, 1980 now allowed.

BACKGROUND OF THE INVENTION

This invention relates to coating, impregnating, and adhesive compositions of a resin-forming polyepoxide mixed with a polyfunctional compound containing cyclic oxazolidinyl groups.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systmes, however, have a drawback that greatly limits the industrial use of the polyepoxides. The known mixtures comprising the polyepoxide and curing agent set up rather rapidly, and this is true even though the mixtures are stored in airtight containers away from moisture and air and even though the temperature is maintained quite low. This difficulty necessitates a mixing of the components just before use and a rapid use of the material before cure sets in. Such a procedure places a considerable burden on the individual operators, and in many cases, gives inferior products resulting from inefficient mixing and too rapid operations.

Numerous attempts have been made to provide a latent curing agent for polyepoxides, by which is meant the type of resin-forming organic compound containing a plurality of vic-epoxy groups of the formula

Such compounds may be saturated or unsaturated, aliphatic, cycloaliphatic, aromatic, or heterocyclic and may be substituted, if desired, with substituents such as chlorine atoms, hydroxyl groups, ether radicals, and the like.

Holm, U.S. Pat. No. 3,291,775 and Gardner and Keough, U.S. Pat. No. 3,547,886 disclose the use of certain polyimines obtainable by reacting a ketone or aldehyde with a polyamine to cure or resinify a polyepoxide.

Hankins and Emmons, U.S. Pat. No. 3,037,006, disclose that copolymers of 5 to 25% by weight of an N-(acryloxyalkyl)-oxazolidine or an N-(acryloxyalkyl)-tetrahydro-1,3-oxazine embraced by the formula

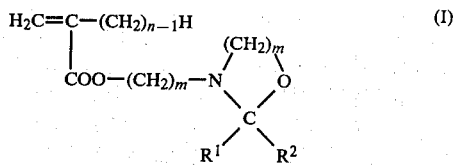

where
n is an integer having a value of 1 to 2,
m is an integer having a value of 2 to 3, $R^1$, when not directly joined to $R^2$, is selected from the group consisting of hydrogen, phenyl, benzyl, and $C_1$–$C_{12}$ alkyl groups, $R^2$, when not directly joined to $R^1$, is selected from the group consisting of hydrogen and $C_1$–$C_4$ alkyl groups and $R^1$ and $R^2$, when directly joined together, form a 5- to 6-carbon ring with the attached carbon atom of the ring in the formula, i.e., $R^1$ and $R^2$, when joined together, are selected from the group consisting of pentamethylene and tetramethylene, can be mixed with polyepoxides for the production of insoluble and infusible crosslinked coatings. There is no suggestion in this patent that the copolymers in which $R^1$ and $R^2$ are independent saturated hydrocarbon groups or together an alkylene group forming a 5- to 6-carbon ring with the attached carbon of the ring in the formula would provide distinctive and unexpected storage-stability properties that are lacking in those copolymers in which either or both $R^1$ and $R^2$ is, or are, hydrogen atoms. $R^1$ and $R^2$ are attached to the 2-position carbon in the heterocyclic ring of the formula.

DESCRIPTION OF THE INVENTION

It is an object of the invention to provide a new class of latent curing agents for polyepoxides. It is a further object to provide new curing agents for polyepoxides that are substantially unreactive with polyepoxides when stored under atmospheres substantially free of moisture. It is a further object to provide new curing agents that can be premixed with the polyepoxides and the mixture stored or shipped without danger of premature gelation. It is a further object to provide new compositions containing polyepoxides that undergo cure only when in contact with moisture. It is a further object to provide a new process for curing polyepoxides that is particularly useful for the preparation of surface coatings. It is a further object to provide new curing agents for polyepoxides that may be cured to prepare high solids or solvent-free coatings. These and other objects of the invention will be apparent from the following detailed description thereof.

In accordance with the present invention, it has been discovered that "one-pot" coating compositions based on a polyepoxide can be prepared with a polyfunctional compound or polymer containing a plurality of pendant 2,2-dialkyl-oxazolidinyl or 2,2-alkylene-oxazolidinyl groups of the formula

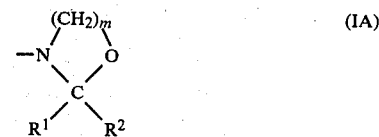

where
m is an integer having a value of 2,
$R^1$ and $R^2$ are individual alkyl groups, e.g. having 1 to 12 carbon atoms, or together may be a pentamethylene or tetramethylene group forming a 5- to 6-carbon ring with the attached carbon of the ring in the formula,
or the analogous 2,2-dialkyl- or 2,2-alkylene-tetrahydro-1,3-oxazinyl groups of the formula IA where m is 3. These groups are generically referred to hereinafter as cyclic oxazolidinyl groups.

It has been discovered that the polyepoxide may be mixed with a polyfunctional compound or a vinyl addition or condensation polymer containing a plurality of pendant (and/or terminal) cyclic oxazolidinyl groups of Formula IA in the absence of water and formulated with conventional non-aqueous ingredients, such as pigments, fillers, dispersing agents, and rheological agents to prepare coating compositions that can be packaged in closed containers in the absence of moisture and stored therein for extensive period of time without reaction between the polyepoxide and the compound or polymers containing the pendant oxazolidinyl groups of Formula IA. However, when the composition is subsequently spread out and exposed to moist atmosphere, the composition sets up or cures even at ambient temperature (of about 15° to 25° C.) to form a hard, infusible film. The poly(formula IA cyclic) compound may be obtained in any of several ways. An N-hydroxyalkyl-2,2-dialkyl- or 2,2-alkylene compound having a cyclic group of Formula IA may first be prepared by reacting diethanclamine or dipropanolamine with a dialkylketone, or a cyclopentanone or cyclohexanone. The resulting cyclic oxazolidinyl compound can then be converted into a poly(ester) by using it to transesterify a polyester of a polycarboxylic acid, such as dimethyladipate, dimethylsuccinate, and so on. The resulting poly(IA)cyclic compound is effective as a curing agent for a polyepoxide when mixed therewith and then applied, in the mixture, for coating, impregnating, or binding in the presence of moisture. It is essential that there be no other amine nitrogen groups in the polyfunctional compound containing the cyclic IA groups.

Similarly the N-hydroxyakyl cyclic oxazolidinyl compound may be reacted with a polyisocyanate, such as a diisocyanate or triisocyanate. Then, the resulting product may be mixed with the polyepoxide in the absence of moisture, in which condition it remains effectively stable for months but upon spreading out the composition in the form of a film and exposing the latter to water or atmospheric moisture, the composition is cured or crosslinked to an infusible and insoluble condition.

The vinyl addition polymers containing the pendant groups of formula IA are preferably copolymers of the 2,2-dialkyl- or 2,2-alkylene-monomers of formula I above with at least one other monoethylenically unsaturated copolymerizable monomer of non-ionic nature having a group of the formula $H_2C=C<$, such as styrene, vinyl toluene, acrylonitrile, and $C_1$ to $C_{18}$ alkyl esters of acrylic acid or methacrylic acid, e.g., methyl, ethyl, butyl, cyclohexyl, and 2-ethylhexyl (meth)acrylate. The copolymer may contain as little as 5% by weight of the monomer of formula I up to as much as 70% by weight thereof, but preferably from about 2% to about 35% by weight thereof. It is essential, however, that all of the monomer of Formula I present in the copolymer consist of the 2,2-dialkyl or 2,2-alkylene substituted groups defined by formula IA above. Of these monomers, the preferred ones are the 2,2-dialkyl-oxazolidinylethyl (meth)acrylate.

The copolymers may be prepared by solution (organic solvent) polymerization as hereinafter described in Example IA).

The polyepoxides and poly(functional) compounds or vinyl addition copolymers having pendant formula IA groups may be mixed in a wide range of proportions. In general, however, the amount of poly(functional) compound or copolymer used should provide approximately one equivalent of amine (developed in contact with water or moisture in the ambient air) for each equivalent of epoxy gorup. Depending on the particular composition or use, the ratio of amine/epoxy equivalency may vary from about 4:1 to about 1:4 or possibly even over a wider range in some instances. As used herein, the equivalent amount of poly(functional) compound or copolymer is that amount needed to furnish one amino hydrogen upon hydrolytic opening of the formula IA ring to produce a group of the formula $-N(H)-(CH_2)_m-OH$ (herein designated formula IB) with liberation of a ketone $R^1R^2C=O$ In preparing the mixtures of the present invention, it is sometimes desirable to have the polyepoxide in a mobile liquid condition when the poly(IA)compound or polymer is added so as to facilitate thorough mixing. The polyepoxides as described below are generally viscous to solid materials at ordinary temperature. With those that are liquid, but too viscous for readily mixing, they are either heated to reduce the viscosity or have a liquid solvent added thereto in order to provide fluidity. Normally, solid members are likewise either melted or mixed with a liquid solvent. Various solvents are suitable for achieving fluidity of the polyepoxides. These may be volatile solvents which escape from the mixed compositions by evaporation before or during the curing such as ketones like acetone, methyl ethyl ketone, methyl n-propyl ketone, methyl isobutyl ketone, isophorone, etc., esters such as ethyl acetate, butyl acetate. Cellossolve ® acetate (ethylene glycol monoacetate), methyl Cellosolve acetate (acetate of ethylene glycol monomethylether), etc.; ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethylphthalate, or liquid monoepoxy compounds including glycidyl allyl ether, glycidylphenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The polyepoxides to be used in the process of the invention include those organic compounds containing a plurality of epoxy groups, i.e., groups of the formula

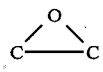

These compounds may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type have been defined in terms of epoxy equivalent value. The meaning of this expression is described in U.S. Pat. No. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides and/or contain macromolecules of somewhat different molecular weight so the epoxy equivalent value may be quite low and contain fractional values. The polymeric material may, for example, have epoxy equivalent values, such as 1.5, 1.8, 2.5, and the like.

Various examples of polyepoxides that may be used in the process of the invention are given in U.S. Pat. No. 2,633,458 and it is to be understood that so much of the disclosure of that patent relative to examples of polyepoxides is incorporated by reference into this specification.

A group of polyepoxides which are not specifically illustrated in the above patent but are of particular value are those which contain terminal epoxy groups of the formula

(II)

and include glycidyl polyethers of polyhydric phenols or polyhydric alcohols. These preferred resin-forming polyepoxides may be termed "ethoxyline" resins and are more particularly defined as organic compounds free of functional groups other than hydroxyl and epoxy groups which contain at least 2 vic-epoxy groups in which the oxygen is attached to adjacent singly-bonded carbon atoms and which have a molecular weight in the range of about 250 to 5,000. The polyepoxides having epoxy equivalencies from 100 to 1,025 have generally been found useful. Those having greater epoxy equivalencies up to about 1500 or higher may be used when special care is taken to select the comonomer(s) of the formula IA copolymer as well as the proportion(s) thereof relative to polyepoxide, to provide mutual compatibility.

Polyepoxides that may be used include the "ethoxylene resins" available under the tradenames of D.E.R., D.H.R., Epon, Eponex, or Araldite resins. They include polyether derivatives of polyhydric phenol containing epoxy groups and may be prepared by effecting reaction between epichlorohydrin and a polyhydroxy phenol or alcohol, such as Bis-Phenol A, or the completely hydrogenated product of Bis-Phenol A.

There may also be used as the polyepoxide component addition copolymers of glycidyl acrylate, glydicyl methacrylate, glycidyl vinyl ether, or glycidyl vinyl sulfide with other monoethylenically unsaturated comonomers containing a group of the formula $H_2C=C<$ such as a $C_1-C_{18}$ alkyl ester of acrylic acid or methacrylic acid, styrene, vinyl acetate, acrylonitrile, and vinylchloride. The copolymers may contain up to 40% by weight of the one or more of the glycidyl esters or ethers, and preferably contain about 10% to 30% by weight thereof.

The vinyl copolymerization system just mentioned may be used to incorporate both components in a single polymeric compound. By including in the comonomers a 2,2-dialkyl-oxazolidinylalkyl (meth)acrylate or a 2,2-alkylene analogue, a copolymer of an unsaturated glycidyl-containing monomer with the formula IA-containing unsaturated oxazolidinyl monomers defined hereinabove may be produced under anhydrous conditions so that upon spreading the copolymer as a coating or adhesive and subjecting the latter to moisture, the pendant oxazolidinyl cyclic groups hydrolyze to form secondary amine groups in the copolymer chain which cure the vic-epoxy groups therein. The copolymers contain about one equivalent of latent amine for each equivalent of epoxy therein.

In the following examples which are illustrative of coating and adhesive embodiments of the present invention, the parts and percentages are by weight and the temperatures are in Celsius degrees unless otherwise noted.

EXAMPLE I.

Preparation of a MEOXEMA Copolymer and a Crosslinked Coating with it and a resin-forming Polyepoxide (A) 2-Ethyl-3-(2-hydroxyethyl)-2-Methyl-Oxazolidine (MEHEOX)

A mixture of 315 g (3 mols) of diethanolamine, 432 g (6 mols) of methylethylketone, and 100 ml of cyclohexane is stirred and heated to reflux using a Dean-Stark trap to separate the water formed. The mixture is stirred and refluxed for a total of 31½ hours during which 54 ml of aqueous layer, 85% water and 15% methyl ethyl ketone by NMR, is collected (85% of the theoretical amount of water of reaction). The mixture is then concentrated and the residue distilled to give 373 g (78% yield) of product (MEHEOX), b.p. 85°–88° C./2.5–3.0 mm Hg.

(B) Methacrylate of MEHEOX (MEOXEMA)

A mixture of 2800 g (28 mols) of methyl methacrylate, 1114 g (7 mols) of 2-ethyl-3-(2-hydroxyethyl)-2-methyl-oxazolidine (MEHEOX), 20 g of hydroquinone and 17.5 g (0.07 mol) of dibutyltin oxide is stirred and heated while a slow stream of dry air is passed thru the mixture. The vapor is fractionated using a 10-stage Oldershaw column equipped with an isothermal distillation controller set for 50% takeoff below 65° C. and 100% reflux when the temperature exceeds 65° C. After three hours, 83% of the theoretical amount of methanol has been collected and a precipitate begins to form in the reaction mixture. The mixture is cooled to room temperature and filtered. The solid is washed with methyl methacrylate and air-dried to give 8.5 g of a tan powder which contains 42% tin by elemental analysis. Excess methyl methacrylate is stripped from the filtrate and 1326 g of a mixture of product and 2-ethyl-3-2(2-hydroxyethyl)-3-methyl-oxazolidine is distilled from the flask. This crude product is inhibited with 10 g of hydroquinone and redistilled through an eight-inch Vigreaux column, again using an air sparge, to give 1007 g (63% yield) of product, b.p. 107°–109° C./1.8–2.0 mm Hg.

(C) Copolymer of Styrene and MEOXEMA (57.88/42.11)

To 250 g of xylene, maintained at reflux (138° C.) is added continuously (dropwise) over a period of 4 hours a solution of 289.43 g of styrene, 210.57 g of MEOXEMA and 6.67 g of a 75% solution of t-butyl peracetate in mineral spirits (available commercially under the trademark designation Lupersol ® 70). The polymerizing solution and the feed solution of monomers and catalyst may both be sparged continuously with dry nitrogen during the 4-hour period of addition.

When the addition is completed, heating is continued for 0.5 hour. Then an additional charge of 0.67 g of Lupersol 70 is added and heating at reflux is continued for 1 hour before cooling the completed resin to ambient temperature.

(D) Coating with a Polyepoxide

To 10.0 g of the copolymer prepared in Part C is added 5.00 g of ethoxyethanol acetate and 4.40 g of a 50% solution of Epon ® 828* dissolved in ethoxyethanol acetate. After mixing, a 5 mil wet film is coated on a phosphatized steel panel (Bonderite ® 1000). After 2 weeks curing at 70° F./50% RH, the KHN is 17.6 and reverse impact greater than 10 in-lbs. Heating at 140° F. for 24 hrs. increases the KHN to 19.6 and the reverse impact to more than 150 in-lbs. Chemical resistance of the coating is excellent both before and after heating.

*A liquid diglycidyl ether Bis-phenol A resin having a viscosity of 10,000–16,000 cps. (25° C.) and an epoxide equivalent weight of 185–192.

EXAMPLE II.

Preparation of a 2,2-Dialkyloxazolidinyl Functional Polyurethane and Coating with Polyepoxy Resins (A) A solution of 44.2 g (0.1 mole N=C=O) of an isocyanate terminated polyurethane prepolymer (available commercially under the trademark designation Spenkel ® P-49-60CX) and 15.9 g (0.1 mole) of 2-ethyl-3-(2-hydroxyethyl)-2-methyl-oxazolidine is prepared in a tightly stoppered bottle and held at ambient temperature for 24 hours. The viscous product is dissolved in 60.0 g of anhydrous butyl Carbitol ®. This solution (II-A) contains 0.76 MEq/g of amine by titration in glacial acetic acid with perchloric acid using crystal violet indicator.

(B) To 15.0 g (11.4 MEq) of Solution II-A there is added 2.0 g (11.4 MEq) of Epon 828 and after thorough mixing, a coating is prepared on a Bonderite 1000 test panel at a 5-mil wet film thickness. After curing under ambient conditions (7 days/25° C., 1 day/60° C.) the film is swelled but not dissolved by methylene chloride (MDC) and is not affected by two hours exposure to cheese cloth patches wet with 10% aqueous acetic acid and toluene. Coating solution in a stoppered bottle is fluid after nearly 3 months storage at ambient temperature.

EXAMPLE III.

Preparation of the tri-2[3(2-ethyl-2-methyl-oxazolidinyl)]-ethyl carbamate of 1,6-hexane diisocyanate trimer (A) Oxazolidine Component A solution of 19.9 g (0.125 mole) of 2-ethyl-3-(2-hydroxyethyl)-2-methyl-oxazolidine, 26.6 g (0.125 equivalents N=C=O) of a 75% solution of 1,6-hexamethylene-diisocyanate trimer (available under the trademark Desmodur N) in Cellosolve acetate, and 42.2 g of toluene is heated at 95° C. for 11 hours. After cooling to room temperature, the solution (III-A) is filtered and found to contain 1.44 MEq/g of amine by titration.

(B) Coating with Polyepoxide

To 10.0 g (1.44 MEq) of the polymer Solution III-A is added 2.45 g of Epon 828, and after mixing, a coating (5 mils wet) is prepared on a Bonderite 1000 panel. After curing 7 days/25° C., 1 day/60° C. a tack free, clear, tough film is obtained that is unaffected by exposure at ambient temperature, to patches of cheesecloth saturated with 10% acetic acid and toluene, for 2 hours.

EXAMPLE IV.

Dialkyloxazolidinyl Diester and a Coating Prepared from it and a Polyepoxide (A) Diester In a 500-ml three-necked flask, fitted with a stirrer, nitrogen sparging tube and a mirrored, vacuum jacketed, sieve plate fractionation column with reflux condenser and a proportionally timed distillation take-off mechanism, a solution of 125 g of toluene, 79.6 g (0.5 mole) of 2-ethyl-3-(2-hydroxyethyl)-2-methyl-oxazolidine, 43.8 g (0.25 mole) of dimethyl adipate, and 0.27 g (0.005 mole) of sodium methoxide is heated at reflux for 6 hours. During this time methanol/toluene azeotrope boiling at 65° C. is collected yielding a total distillate weighing 26.2 g corresponding to 15.8 of methanol (99% of theory). Two successive additional charges of 0.30 g of sodium methoxide are added to the refluxing solution during this 6 hour period.

Upon cooling to room temperature the solution is filtered to remove insoluble catalyst residues. The clear filtrate (IVA) contains 4.3 MEq/g amine.

(B) Coating

To 10.0 g (43.0 MEq) of the solution prepared in Part IV-A is added 7.3 g (43.0 MEq) of Epon 828. After mixing, a 5 mil wet film coating is prepared on Bonderite 1000. After curing for 7 days/25° C., 1 day/60° C. a tack free, clear, tough coating is obtained which is swelled but not dissolved by methylene chloride and which is unaffected by exposure for 2 hours to cheesecloth patches saturated with 10% aqueous acetic acid and toluene.

EXAMPLE V.

Polymer Containing Both Epoxy and Dialkyloxazolidinyl Functionality and a Coating From It.

(A) Polymer

To 300 g of refluxing xylene, sparged with dry nitrogen gas, there is added over a period of 4 hours, a solution of 90.44 g of methyl methacrylate (MMA), 129.06 g of butyl methacrylate (BMA), 48.23 g of 2-(2,2-dimethyloxazolidinyl) ethyl methacrylate (DMOXEMA), 32.27 g of glycidyl methacrylate (GMA), and 8.00 g of Lupersol 70. When the addition is complete the solution is maintained at reflux for 0.5 hours, then, 0.80 g of Lupersol 70 is added and refluxing is continued for 1.0 hour, before cooling to room temperature. The solution (V-A) is straw yellow and clear. The monomer components of this polymer are in the molar ratio of 4/4/1/1//MMA/BMA/GMA/DMOXEMA.

The solution (V-A) of poligomer appears unchanged after 4.5 months storage in a stoppered bottle at ambient temperature.

(B) Coating

A clear coating of (V-A) is cast as a 6-mil wet film on Bonderite 1000. The coating is tack-free after 15 min. at ambient temperature. After curing 18 days at ambient temperature the coating is swelled by methylene chloride; it shows slight blistering and haze when exposed for 1 hour to a cheesecloth patch saturated with 10% aqueous acetic acid; it is not attacked by 10% sodium hydroxide solution, and is only slightly swollen by gasoline and methanol after 1 hour.

EXAMPLE VI (A) Part (A) of Example I is a process for making MEHEOX, i.e., 2-ethyl-3-(2-hydroxyethyl)-2-methyl-oxazolidine by reaction of diethanolamine with methyl ethyl ketone. Replacement of the latter ketone with acetone in molarly corresponding amount yields 3-(2-hydroxyethyl)-2,2-dimethyl-oxazolidine, herein referred to by the acronym DMHEOX, i.e., dimethyl-hydroxyethyloxazolidine. Replacement of the ketone with cyclopentanone or cyclohexanone yields 3-(2-hydroxyethyl)-2,2-tetramethylene- or 3-(2-hydroxyethyl)-2,2-pentamethylene-oxazolidine.

For comparison purposes, isobutyraldehyde is used in place of the ketone so that the reaction with diethanol amine produces 3-(2-hydroxyethyl)-2-isopropyl-oxazolidine (IPHEOX) in which only one of the hydrogens on the 2-carbon position of the oxazolidinyl ring is replaced with an alkyl group. Likewise, 3-(2-hydroxyethyl)-oxazolidine (HEOX) is obtained when formaldehyde is used instead of isobutylaldehyde.

(B) The procedure of Part (B) of Example I is used to prepare the acrylate (using methyl acrylate instead of methyl methacrylate) or the methacrylate of the various 3-(2-hydroxyethyl)-oxazolidines mentioned in Part (A) hereof. The methacrylate of HEOX is referred to simply by the acronym, OXEMA; the methacrylate of IPHEOX is referred to as IPOXEMA; that of MEHEOX, MEOXEMA; that of DMHEOX, DMOXEMA, and so on.

(C) Copolymers are prepared from the various methacrylates produced in Part (B) hereof by the general procedure described in Example (IC) hereinabove with styrene (S), acrylonitrile (A), methyl methacrylate (MMA), butyl methacrylate (BMA).

Table, I, in the first column gives the identification number (Id. No.) of nine copolymers conforming to the requirements of the invention that both hydrogens on the 2-carbon in the oxazolidine ring are substituted by alkyl groups or an alkylene group and three comparision co-polymers, two of them being identified by C1 and C2 in which the 2-position of the oxazolidine ring has 2 H atoms (SO) and one H (SI) respectively but otherwise is similar to copolymer Id. No. 5 just above these two controls. The third comparison copolymer is C3 to be compared with Id. No. 9. The second column gives the composition of the copolymers and the molar ratio of the components thereof. The numeral in ( ) in this column indicates the percentage of t-butylperacetate initiator used, based on total monomer weight. The next column lists the grams of comonomer used and the particular comonomer by a letter symbol. The next column is the grams of oxazolidine monomer and the particular one used by symbol (see the key in the footnote). The next column indicates the grams of solvent used; the next to last column gives the amine titer in milliequivalents per gram (ME/g) of the product.

TABLE I
OXAZOLIDINE COPOLYMERS

| Id. No. | Copolymer Code** | Comonomer g | Code** | Oxa-monomer g | Code** | Solvent g | Code** | Product % Solids | Amine Titer |
|---|---|---|---|---|---|---|---|---|---|
| 1 | SM 2/1 (5) | 91.7 | S | 100.0 | M | 127.8 | CA | 60 | 1.21 |
| 2 | SM 3/1 (3) | 137.5 | S | 100.0 | M | 158.3 | PB | 60 | 1.09 |
| 3 | SM 3/1 (1) | 137.5 | S | 100.0 | M | 158.3 | PB | 60 | 1.10 |
| 4 | SM 5/1 (3) | 229.3 | S | 100.0 | M | 219.5 | PB | 60 | 0.75 |
| 5 | SD 3/1 (3) | 316.0 | S | 215.0 | D | 758.6 | XY | 70 | 1.28 |
| C1 | SO 3/1 (3) | 181.4 | S | 107.6 | O | 180.8 | PB | 60 | 0.77 |
| C2 | SI 3/1 (3) | 234.0 | S | 170.5 | I | 253.5 | PB | 60 | 0.72 |
| 6 | SAM 4/1/1 (3) | 183.4 | S* | 100.0 | M | 204.5 | PB | 60 | 0.82 |
| 7 | MMA/M 3/1 (3) | 132.1 | MMA | 100.0 | M | 154.7 | PB | 60 | 1.02 |
| 8 | BM 3/1 (2) | 163.1 | B | 86.9 | M | 250.0 | BC | 50 | 0.558 |
| 9 | BD 4/1 (2) | 218.2 | B | 81.8 | D | 300.0 | XY | 50 | 0.640 |
| C3 | BO 3/1 (3) | 426.0 | B | 194.7 | O | 611.0 | XY | 50 | 0.818 |

*Plus 23.4 g acrylonitrile (A)
**Symbols of codes
S = styrene
A = acrylonitrile (in ID. No. 6)
B = butyl methacrylate
MMA = methyl methacrylate
M = MEOXEMA
D = DMOXEMA
O = OXEMA
I = IPOXEMA
CA = 2-ethoxyethyl acetate
BC = 2-butoxyethanol
XY = xylene
PB = Propasol B ® of the formula:

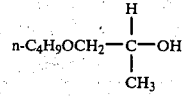

(D) Coating compositions are prepared by mixing a 10-gram portion of each of the products listed in Table I identified therein with Id. Nos. 1 through 5, C1,C2, and Id. Nos. 6 through 9 with an amount of 100% polyepoxide condensate, namely the commercial product Epon ® 828 such that the ratio of NH/epoxy equivalents is 1:1. Also, 10 g of the solution II-A (prepared in part A) of Example II) of polyfunctional resin-forming condensate (of 2-ethyl-3-(2-hydroxyethyl)-2-methyl-oxazolidine with the isocyanate-terminated polyurethane prepolymer) is mixed with the same polyepoxide to provide a 1:1 equivalency ratio of NH:epoxy.

Table II in column 1 lists the oxazolidine copolymer or resin by the Id. Nos. in Table I and by II-A for the last-mentioned product. The second column of Table II gives the amount of Epon 828 added. The third column refers to the properties of 5-mil wet film cast on Bonderite 1000 test panels after 20 hours and the fourth column gives the methylene dichloride (MDC) resistance of such films at 1 to 4 days. The next seven columns give the appearance, hardness (Knoop Hardness No. - KHN), and various resistances after 3 weeks ambient curing (70° F./ 50% relative humidity) of such films. The final column gives the stability of the coating solution when stored in the absence of moisture in closed cans or drums at 25° C.

C3, with an amount of a 75% solution in xylene of Epon ® 1001 that provides an NH/epoxy equivalent ratio of 1:1 or 1:2 as indicated in the second column of Table III. Also, a 10-gram portion of solution IIA and of solution IIIA are mixed with enough of the polyepoxide to provide an NH/epoxy equivalent ratio of 1:1 and also an additional 10-g portion of III-A is mixed with enough of the polyepoxide to provide an NH/epoxy equivalent ratio of 1:2. Table III gives the properties of the test film prepared from the mixtures as in (D) above and the stability of the coating mixture. The same footnotes apply as in Table II.

The polyepoxide used in Part (E) and in Part (B) are of the class generally defined as the glycidyl polyethers

TABLE II

MIXTURE OF POLY(OXAZOLIDINE) AND EPON-828

| Id. No. | g E-828 (100%) | Prop.[3] 20 Hrs. | MDC[4] Resist./ Days | Properties on 3 weeks Ambient Curing 70° F./50% R.H. | | | | | | | Stability[3] (25° C.) of Mixture |
|---|---|---|---|---|---|---|---|---|---|---|---|
| | | | | Appear.[3] | KHN | MDC[4] | HAc[5] | HCl[5] | Tol.[5] | MEOH[5] | |
| 1 | 2.42 | C, H, G, TF | 4/4 | C, H, G, TF | 19.0 | 4 | 4 | 4 | 3 | 2 | C, F, 84 days |
| 2 | 2.18 | C, H, G, TF | 4/4 | C, H, G, TF | 18.9 | 4 | 4 | 4 | 3 | 3 | C, F, 84 days |
| 3 | 2.20 | C, H, G, TF | 4/4 | C, H, G, TF | 18.4 | 4 | 4 | 4 | 3 | 3 | C, F, 84 days |
| 4 | 1.50 | C, H, G, TF | 4/4 | C, H, G, TF | 17.8 | 4 | 4 | 4 | 3 | 3 | C, F, 84 days |
| 5 | 2.56 | C, H, G, TF | 3/2 | C, H, G, TF | 19.6 | 4 | 4 | 4 | 3 | 3 | C, F, 84 days |
| C1 | 1.61 | C, H, G, TF | 3/1 | C, H, G, TF | 16.3 | 3 | 4 | 4 | 3 | 2 | Gel, <3 da. |
| C2 | 1.48 | C, H, G, TF | 3/1 | C, H, G, TF | 18.7 | 3 | 3 | 4 | 3 | 3 | Gel, >30 da., <84 da. |
| 6 | 1.64 | C, H, G, TF | 4/4 | C, H, G, TF | 17.4 | 4 | 4 | 4 | 3 | 3 | C, F, 84 da. |
| 7 | 2.04 | C, H, G, TF | 4/2 | C, H, G, TF | 15.6 | 4 | 1 | 1 | 3 | 3 | C, F, 84 da. |
| 8 | 1.36 | C, S, G, St | 4/4 | C, St | 6.68 | 3 | 1 | 4 | 2 | 2 | C, F, 84 da. |
| 9 | 1.28 | C, S, G, St | 3/2 | C, St | 2.90 | 4 | 1 | 4 | 1 | 3 | C, F, 84 da. |
| II-A | 1.52 | C, H, G, TF | T/4 | C, T | 10.7 | 4 | 1 | 4 | 1 | 3 | C, F, 84 da. |

[3] C = clear; H = hard; G = glossy; TF = tack-free, S = soft; St = slight tack; T = tacky; F = fluid
[4] Ratings in methylene dichloride (MDC)
4 = swelled with no soluble fraction
3 = swelled with slight amount of solubles
2 = swelled with significant solubles
1 = dissolved
[5] 10% aqueous HAc (acetic acid) with HCl, toluene and methanol; patch tests, 2 hrs with acids, 1 hr with solvents
4 = no change
3 = slight softening
2 = significant softening
1 = delaminated or dissolved (E) Coating compositions are prepared by mixing 10-gram portions of the products listed in Table I identified with Id. No. 1 through 5, C1, C2, 6 through 9, and of Bis-phenol A obtained by reacting 2,2-bis-(4-hydroxyphenyl)propane with epichlorohydrin as described in U.S. Pat. No. 2,633,458.

TABLE III

MIXTURE OF POLY(OXAZOLIDINE) AND EPON 1001

| Id. No. | NH/ Epoxy | g E-1001 (75%) | Prop.[3] 20 Hrs | MDC[4] RES Day | Properties on 3 weeks Ambient Curing 70° F./50% R.H. | | | | | | | Stability[3] of Mixture 25° C. |
|---|---|---|---|---|---|---|---|---|---|---|---|---|
| | | | | | Appear.[3] | KHN | MDC[4] | HAc[5] | HCl[5] | Tol.[5] | MEOH[5] | |
| 1 | 1/1 | 8.07 | C, H, G, TF | 4/4 | C, H, G, TF | 14.8 | 4 | 4 | 4 | 4 | 2 | C, F; 84 da. |
| 2 | 1/1 | 7.27 | C, H, G, TF | 4/4 | C, H, G, TF | 11.8 | 4 | 4 | 4 | 4 | 3 | " |
| 2 | ½ | 14.54 | C, H, G, TF | 4/4 | C, H, G, TF | 9.27 | 4 | 4 | 4 | 4 | 2 | " |
| 3 | 1/1 | 7.33 | C, H, G, TF | 4/4 | C, H, G, TF | 14.4 | 4 | 4 | 4 | 4 | 3 | " |
| 4 | 1/1 | 5.00 | C, H, G, TF | 4/4 | C, H, G, TF | 14.4 | 4 | 4 | 4 | 4 | 2 | " |
| 5 | 1/1 | 8.53 | C, H, G, TF | 3/2 | C, H, G, TF | 16.3 | 4 | 4 | 4 | 4 | 3 | " |
| 5 | ½ | 17.16 | C, H, | 3/2 | C, H, | 16.5 | 4 | 4 | 4 | 4 | 3 | " |

TABLE III-continued

MIXTURE OF POLY(OXAZOLIDINE) AND EPON 1001

| Id. No. | NH/ Epoxy | g E-1001 (75%) | Prop.[3] 20 Hrs | MDC[4] RES Day | Appear.[3] | KHN | MDC[4] | HAc[5] | HCl[5] | Tol.[5] | MEOH[5] | Stability[3] of Mixture 25° C. |
|---|---|---|---|---|---|---|---|---|---|---|---|---|
| C1 | 1/1 | 5.36 | C, H, G, TF | 4/1 | C, H, G, TF | 17.7 | 3 | 4 | 4 | 4 | 3 | gel, 3 da. |
| C2 | 1/1 | 4.93 | C, H, G, TF | 3/1 | C, H, G, TF | 21.0 | 3 | 4 | 1 | 4 | 3 | gel, >30, <84 days |
| 6 | 1/1 | 5.47 | C, H, G, TF | 4/4 | C, H, G, TF | 17.5 | 4 | 4 | 4 | 4 | 3 | C, F; 84 da. |
| 7 | 1/1 | 6.80 | C, H, | 4/2 | C, H, | 13.4 | 4 | 1 | 4 | 4 | 3 | " |
| 7 | ½ | 13.60 | C, H, | ¾ | C, H, | 10.7 | 3 | 4 | 4 | 4 | 3 | " |
| 8 | 1/1 | 3.72 | C, H, G, TF | 3/2 | C, H, G, TF | 9.68 | 4 | 4 | 4 | 4 | 3 | " |
| 9 | 1/1 | 4.27 | C, H, G, TF | 3/2 | C, H, G, TF | 7.42 | 4 | 4 | 4 | 1 | 1 | " |
| C3 | 1/1 | 5.45 | C, H, G, TF | ¼ | C, H, G, TF | 15.3 | 3 | 3 | 4 | 2 | 2 | gel >30, <84 days |
| II-A | 1/1 | 2.85 | C, T | T/4 | C,S,TF | * | 4 | 1 | 4 | 1 | 2 | gel >30, <84 days |
| III-A | 1/1 | 5.40 | C, H, G, TF | 4/4 | C, H, G, TF | 4.54 | 4 | 1 | 1 | 3 | 3 | C,F; 84 das. |
| III-A | ½ | 10.80 | " | 4/4 | " | 11.8 | 4 | 1 | 1 | 3 | 3 | " |

*Rubbery; Other footnotes are same as in Table II (F) Coating compositions are prepared with 10-gram portions of oxazolidine copolymer Id. Nos. 1 through 9 of Table I by mixing each portion with a diglycidyl ether condensate of Bis-phenol A which has been hydrogenated to saturate the aromatic groups. The polyepoxide used therein may therefore be properly designated a glycidyl polyether of 2,2-bis-(4-hydroxycyclohexyl)propane. This saturated polyepoxide is preferred for reasons of durability against ultraviolet light. An amount of the saturated polyepoxide thereby obtained is added to each of the 9 copolymers to provide an equivalency ratio of 1:1 of NH/epoxy in the mixture. A 50% solution, in xylene of Propasol B, of a polyepoxide of the type available under the trademark Eponex® 151.1 is used. A comparison mixture of a 10-gram portion of a commercially available condensation product of a long-chain fatty acid and an aliphatic polyamine, identified as V in Table IV, that has been used as a polyepoxy resin curing agent is provided.

The mixtures are coated, stored, and tested in the same way as the mixtures and films thereof were tested in (D) and (E) hereinabove. Also, the same footnotes as in Table II apply to the tabulation of results in Table IV following.

The present invention is the result of the discovery that (poly)functional oxazolidines in which both hydrogen atom of the II-position carbon in the ring is substituted by alkyl groups or an alkylene group serve as latent polyepoxide curing agents and resin-forming polyepoxides can be mixed with the latent curing agent and stored in the absence of moisture for months without noticeable change or reaction but that on formation of films of the composition and exposure thereof to moisture, even ambient air having a relative humidity of at least 20%, and preferably at least 50%, provides reasonably rapid curing to form hard, high performance coatings. In contrast, mixtures of a resin-forming polyepoxide with (poly) functional oxazolidines in which neither or only one of the hydrogen atoms on the 2-position carbon is replaced with alkyl or alkylene groups lack stability on storage; even in the absence of moisture such an oxazolidine undergoes reaction directly with the polyepoxide as a tertiary amine that causes gelation. Apparently the 2,2-dialkyl or 2,2-alkylene oxazolinyl rings of Formula IA are in effect sterically hindered and must be hydrolyzed by moisture to produce an hydroxyalkyl group of formula IB supra to cure the polyepoxide.

TABLE IV

MIXTURE OF POLY(OXAZOLIDINE) AND EPONEX[R] 151.1

| Id. No. | g E-151.1 (50%) | Prop.[3] 20 Hrs. | Resist./ Days | Appear. | KHN | MDC[4] | HAc[5] | HCl[5] | Tol.[5] | MEOH[5] | Stability[3] (25° C.) of Mixture |
|---|---|---|---|---|---|---|---|---|---|---|---|
| 1 | 2.84 | C, H, G, TF | 4/4 | C, H, G | 15.7 | 4 | 1 | 2 | 3 | 3 | C, F; 84 days |
| 2 | 2.56 | C, H, G, TF | 4/4 | " | 15.6 | 4 | 3 | 4 | 3 | 3 | C, F; 84 days |
| 3 | 2.59 | C, H, G, TF | 4/4 | " | 16.7 | 4 | 4 | 4 | 3 | 3 | C, F; 84 days |
| 4 | 1.76 | C, H, G, TF | 4/4 | " | 13.9 | 4 | 4 | 4 | 1 | 3 | C, F; 84 days |
| 5 | 6.01 | C, H, G, TF | 4/4 | " | 10.9 | 4 | 1 | 4 | 1 | 2 | C, F; 84 days |
| 6 | 1.93 | C, H, G, TF | 4/4 | " | 17.3 | 4 | 4 | 4 | 3 | 3 | C, F; 84 days |
| 7 | 2.40 | C, H, G, TF | 4/4 | " | 14.4 | 4 | 1 | 3 | 3 | 3 | C, F, 84 days |
| 8 | 2.62 | C, G, T | ½ | C, S, G | 2.40 | 4 | 1 | 2 | 1 | 3 | C, F, |

TABLE IV-continued

| | | | | MIXTURE OF POLY(OXAZOLIDINE) AND EPONEX[R] 151.1 | | | | | | | |
|---|---|---|---|---|---|---|---|---|---|---|---|
| Id. No. | g E-151.1 (50%) | Prop.[3] 20 Hrs. | Resist./ Days | \multicolumn{7}{c}{Properties on 3 weeks Ambient Curing 70° F./50% R.H.} | | | | Stability[3] (25° C.) of Mixture |
| | | | | Appear. | KHN | MDC[4] | HAc[5] | HCl[5] | Tol.[5] | MEOH[5] | |
| 9 | 3.00 | " | ½ | " | 1.80 | 4 | 1 | 4 | 1 | 3 | 84 days C, F, |
| V | 1.44 | " | 4/4 | H, T, SS* | 7.19 | 4 | 1 | 1 | 4 | 4 | 84 days gel <8 hrs. |

*SS = surface spue

EXAMPLE VII.

Water-Reduced Coatings (A) To 689 g of a solution containing 66.6% polymer solids of a copolymer of styrene and MEOXEMA (3:1 molar ratio) in xylene, having an amine titer of 1.20 ME/g of solution, is added 165.4 g of Epon 828 resin. The resulting solution is heated to 100° C. and xylene is removed by distillation under reduced pressure until the resinous distillation residue contains about 93–4% polymer solids. The resinous distillation residue is then diluted with 111.8 g of methyl n-propyl ketone to obtain a mixture containing 80% polymer solids.

To 50 g of this diluted mixture there is added 1 g of phenoxyethanol and 1 g of Capcure[R] 65 emulsifier followed by the further addition of 16.7 g of water, dropwise and while stirring rapidly, thereby obtaining a water-reduced coating emulsion.

This emulsion is then cast as a 5 mil wet film coating on Bonderite 1000 immediately after preparation and again after the emulsion has been allowed to stand 5 hours at ambient conditions. Both of the resulting coatings are white when freshly cast but become clear after standing 30 minutes at ambient conditions. After curing 7 days at ambient conditions, the coatings are swelled, but not dissolved, by methylene chloride, which property indicates that crosslinking has occurred.

(B) To 189 g of a solution of a copolymer of isobutyl methacrylate and MEOXEMA (3:1 molar ratio) in xylene, having an amine titer of 1.16 ME/g of solution, is added 51.5 g of Eponex[R] 151.1 resin (an aliphatic epoxide resin). The resulting solution is heated to about 100° C. and xylene is removed by distillation under reduced pressure. The resinous distillation residue is then dissolved in 28.2 g of methyl n-propyl ketone. To 50 g of this solution there is added 2.0 g of phenoxyethanol and 1.5 g of Capcure[R] 65 emulsifier followed by the further addition 31.0 g of water, dropwise and while stirring rapidly, thereby obtaining a water-reduced coating emulsion.

This emulsion is then cast as a 7 mil wet film coating on Bonderite[R] 1000 panels. After drying for 30 minutes at ambient temperature, the coating is clear (transparent). After curing for both 30 minutes and for 24 hours at ambient temperature the coating is swelled, but not dissolved, by methylene chloride, which property indicates that crosslinking has occurred.

Preliminary outdoor durability data indicates that the coating of part (B) of this example possesses more prolonged outdoor durability than do similar coatings derived from photochemically reactive aromatic components such as styrene and bis-phenol A.

EXAMPLE VIII.

Preparation of Adhesive Composition

(A) Amine Copolymer

To 150.0 g of xylene, heated at 105° C. with stirring and maintained under a nitrogen atmosphere, is added dropwise over a period of 4 hours a solution of 323.0 g of isodecyl methacrylate, 27.05 g of MEXOEMA and 10.50 g of t-butyl peroctoate. When the addition is complete, an additional charge of 1.05 g of t-butyl peroctoate is added to the stirred polymerization reaction mixture and the temperature is maintained at 105° C. for 30 minutes before cooling the product.

The product is a clear, light yellow solution, contains an amine titer of 0.21 ME/g and has a Mw of 27,9000 and a Mn of 7360 (determined by gel permeation chromatography).

(B) Adhesive Composition

To 10.0 g of the solution obtained in part (A) above is added 0.42 g of Epon[R] 828. The resulting solution is coated as a 2 mil wet film on Bonderite[R] 1000 panels. After drying overnight at ambient temperature, a very tacky and adhesive coating is obtained. The coated film is suitable for use as a pressure sensitive adhesive and adheres to nylon, propylene and polyethylene terephthalate films. The coating is then stored in a stoppered vial at room temperature. After 30 days of storage, the appearance of the solution is unchanged from its initial appearance.

We claim:

1. A vinyl addition copolymer, adapted to be used as the binder for a coating, impregnating, or adhesive composition, comprising an anhydrous organic solvent solution copolymer of monoethylenically unsaturated monomers comprising (1) at least one monomer selected from glycidyl acrylate, glycidyl methacrylate, glycidyl vinyl ether, and glycidyl vinyl sulfide, (2) at least one monomer of the formula:

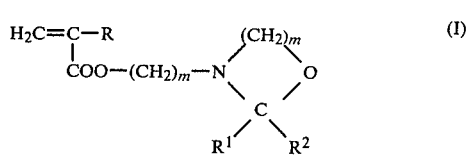

wherein
R is $CH_3$ or H,
m is 2 or 3, and
$R^1$ and $R^2$ individually are separate alkyl groups having at least one carbon atom or are joined directly together to form a $C_4$ to $C_5$ alkylene group, and (3) optionally, other monomer(s) inert to the epoxy group(s) in (1) and the cyclic oxazolidinyl group(s) in (2); the amount of glycidyl monomer of (1) in the copolymer being sufficient to provide at least about one equivalent of epoxy content in the copolymer for each equivalent therein of amine content attributable to the cyclic groups of (2).

2. A copolymer according to claim 1 which comprises at least about 5% by weight of (2) monomer of the formula I as defined therein, and sufficient (1) monomer to provide at least about 1 epoxy equivalent for each amine equivalent of (2) monomer.

3. A copolymer according to claim 1 comprising about 16% by weight of glycidyl methacrylate, about 11% by weight of 2,2-dimethyl-oxazolidinylethyl methacrylate, about 30% by weight of methyl methacrylate, and about 43% by weight of butyl methacrylate.

* * * * *